United States Patent
Quach et al.

(10) Patent No.: US 10,823,412 B2
(45) Date of Patent: Nov. 3, 2020

(54) PANEL SURFACE POCKETS FOR COATING RETENTION

(71) Applicant: United Technologies Corporation, Farmington, CT (US)

(72) Inventors: San Quach, Southington, CT (US); Andreas Sadil, Newington, CT (US); Donald W. Peters, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 374 days.

(21) Appl. No.: 15/477,518

(22) Filed: Apr. 3, 2017

(65) Prior Publication Data
US 2018/0283688 A1  Oct. 4, 2018

(51) Int. Cl.
*F23R 3/00* (2006.01)
*F01D 25/14* (2006.01)
(Continued)

(52) U.S. Cl.
CPC .............. *F23R 3/002* (2013.01); *B32B 3/30* (2013.01); *C23C 2/006* (2013.01); *C23C 4/02* (2013.01);
(Continued)

(58) Field of Classification Search
CPC ............ F23R 3/002; F23R 2900/00004; F23R 2900/00005; F23R 2900/00017; F23R 2900/00018; F23R 2900/00019; F05D 2230/90; F05D 2230/313; F05D 2300/611; F05D 2300/6111; F05D 2240/14; F05D 2240/15; F02K 9/974; F02K 9/34;
(Continued)

(56) References Cited

U.S. PATENT DOCUMENTS 2,564,497 A  8/1951  Louis
3,042,365 A * 7/1962  Curtis .................. F01D 11/125
                                         415/173.4
(Continued)

FOREIGN PATENT DOCUMENTS

EP  2460981 A1  6/2012
EP  2960435 A1  12/2015

OTHER PUBLICATIONS

European Search Report Issued in EP Application No. 18154760.5, dated Jul. 27, 2018, 12 Pages.

*Primary Examiner* — Andrew H Nguyen
*Assistant Examiner* — Stephanie Cheng
(74) *Attorney, Agent, or Firm* — Cantor Colburn LLP

(57) ABSTRACT

A coated panel for a gas turbine engine includes a panel having a panel inner surface and a pocket formed in the panel inner surface, the pocket having a pocket depth. A coating is applied to the pocket such that a coating edge is disposed within the pocket to enhance coating retention to the panel. A gas turbine engine includes a turbine, a combustor to supply hot combustion gases to the turbine along a gas path, and one or more coated panels located along the gas path. The one or more panels includes a panel having a panel inner surface, and a pocket formed in the panel inner surface, the pocket having a pocket depth. A coating is applied to the pocket such that a coating edge is located within the pocket to enhance coating retention to the panel.

13 Claims, 5 Drawing Sheets

(51) Int. Cl.
*F02K 1/82* (2006.01)
*F02K 9/97* (2006.01)
*C23C 2/00* (2006.01)
*C23C 4/02* (2006.01)
*B32B 3/30* (2006.01)

(52) U.S. Cl.
CPC ............ *F01D 25/145* (2013.01); *F02K 1/822* (2013.01); *F02K 9/974* (2013.01); *F05D 2230/90* (2013.01); *F05D 2300/611* (2013.01); *F23R 2900/00018* (2013.01); *Y02T 50/675* (2013.01); *Y02T 50/6765* (2018.05); *Y10T 428/2462* (2015.01); *Y10T 428/24537* (2015.01); *Y10T 428/24545* (2015.01)

(58) Field of Classification Search
CPC . F02K 9/346; F02K 1/82; F02K 1/822; F02K 1/825; F02K 1/827; F01D 5/288; F01D 25/145; F01D 25/24; F02C 7/24; C23C 14/14; C23C 14/16; C23C 4/02; C23C 2/006; B05D 3/12; B32B 3/30; Y10T 428/24545; Y10T 428/24537; Y10T 428/2462; Y10T 50/6765; Y10T 50/675
See application file for complete search history.

(56) References Cited

U.S. PATENT DOCUMENTS

| | | | | |
|---|---|---|---|---|
| 3,126,149 | A * | 3/1964 | Bowers | F01D 11/125 415/173.4 |
| 4,289,447 | A | 9/1981 | Sterman et al. | |
| 4,914,794 | A | 4/1990 | Strangman | |
| 5,064,727 | A * | 11/1991 | Naik | C23C 30/00 415/173.4 |
| 5,080,934 | A * | 1/1992 | Naik | C23C 30/00 427/271 |
| 5,460,002 | A | 10/1995 | Correa | |
| 6,235,370 | B1 * | 5/2001 | Merrill | C23C 4/02 428/116 |
| 7,104,068 | B2 * | 9/2006 | Moraes | F23R 3/002 138/177 |
| 8,506,243 | B2 * | 8/2013 | Strock | C23C 28/00 415/173.1 |
| 8,956,700 | B2 | 2/2015 | Taxacher | |
| 9,194,243 | B2 | 11/2015 | Bolcavage | |
| 2009/0110536 | A1 | 4/2009 | Strock et al. | |
| 2011/0008165 | A1 | 1/2011 | Ottow et al. | |
| 2013/0192233 | A1* | 8/2013 | Eastwood | F23R 3/002 60/752 |
| 2016/0201498 | A1 | 7/2016 | Farris et al. | |
| 2016/0369637 | A1 | 12/2016 | Subramanian | |

* cited by examiner

United States Patent US 10,823,412 B2

PANEL SURFACE POCKETS FOR COATING RETENTION

STATEMENT OF FEDERAL SUPPORT

This invention was made with Government support under contract FA8626-15-D-0015-1901 awarded by U.S. Air Force. The Government has certain rights in the invention.

BACKGROUND

The present disclosure relates to gas turbine engines, and more particularly to coated panels of gas turbine engines.

Hot section components of a gas turbine engine, such as turbine vanes, turbine exhaust cases, exit nozzles, combustor panels and the like often rely on coatings applied to the components to improve thermal performance, durability and/or other properties of the components. In service, there are often coating durability issues due to, for example, component geometry, thermal gradients, component or coating stresses, and/or assembly or disassembly procedures, resulting in wear, erosion or spalling of the coating. Such removal or wear of the coating reduces the durability or performance of the component, thus shortening its useful service life, and requiring maintenance or repair at a more frequent than desired rate.

BRIEF DESCRIPTION

In one embodiment, a coated panel for a gas turbine engine includes a panel having a panel inner surface and a pocket formed in the panel inner surface, the pocket having a pocket depth. A coating is applied to the pocket such that a coating edge is disposed within the pocket to enhance coating retention to the panel.

Additionally or alternatively, in this or other embodiments the pocket includes a base portion and a transition portion extending from the base portion to a pocket edge, the transition portion including one or more radii.

Additionally or alternatively, in this or other embodiments a maximum pocket depth is located at the base portion.

Additionally or alternatively, in this or other embodiments the maximum pocket depth is located at the transition portion.

Additionally or alternatively, in this or other embodiments the base portion is substantially planar.

Additionally or alternatively, in this or other embodiments a plurality of pockets are located in the panel inner surface and ribs are located between adjacent pockets of the plurality of pockets.

Additionally or alternatively, in this or other embodiments the coating is applied over the ribs.

Additionally or alternatively, in this or other embodiments the coating includes a first coating layer applied over the ribs and a second coating layer applied to the pockets without being applied over the ribs.

In another embodiment, a gas turbine engine includes a turbine, a combustor to supply hot combustion gases to the turbine along a gas path, and one or more coated panels located along the gas path. The one or more panels includes a panel having a panel inner surface, and a pocket formed in the panel inner surface, the pocket having a pocket depth. A coating is applied to the pocket such that a coating edge is located within the pocket to enhance coating retention to the panel.

Additionally or alternatively, in this or other embodiments the pocket includes a base portion and a transition portion extending from the base portion to a pocket edge, the transition portion including one or more radii.

Additionally or alternatively, in this or other embodiments a maximum pocket depth is located at the base portion.

Additionally or alternatively, in this or other embodiments the maximum pocket depth is located at the transition portion.

Additionally or alternatively, in this or other embodiments the base portion is substantially planar.

Additionally or alternatively, in this or other embodiments a plurality of pockets are located in the panel inner surface and ribs are located between adjacent pockets of the plurality of pockets.

Additionally or alternatively, in this or other embodiments the coating is applied over the ribs.

Additionally or alternatively, in this or other embodiments the coating includes a first coating layer applied over the ribs and a second coating layer applied to the pockets without being applied over the ribs.

Additionally or alternatively, in this or other embodiments the coated panel is located at one of the combustor, a turbine exhaust case or an exhaust nozzle of the gas turbine engine.

In yet another embodiment, a combustor panel for a gas turbine engine includes a panel having a panel inner surface, a pocket formed in the panel inner surface, the pocket having a pocket depth, and a coating applied to the pocket such that a coating edge is located within the pocket to enhance coating retention to the panel.

Additionally or alternatively, in this or other embodiments a plurality of pockets are located in the panel inner surface and a plurality of ribs are located between adjacent pockets of the plurality of pockets.

Additionally or alternatively, in this or other embodiments the coating is applied over the ribs.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
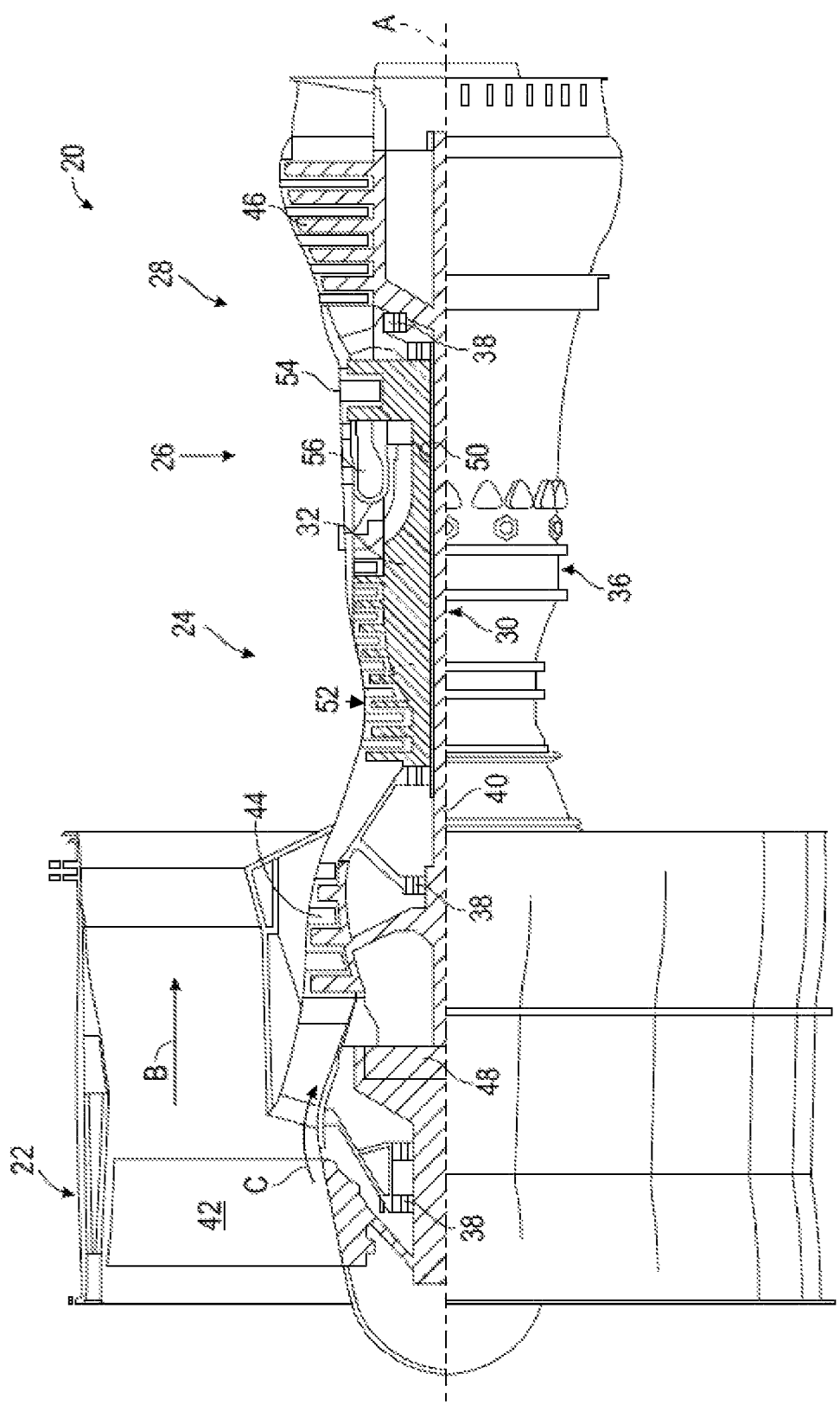
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. High temperature exhaust gas is then expelled from the turbine section 28 via a turbine exhaust case 58 and an exit nozzle 60. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]0.5$. The "Low corrected fan tip speed" as disclosed herein according to one non-limiting embodiment is less than about 1150 ft/second (350.5 m/sec).

Figure 2:
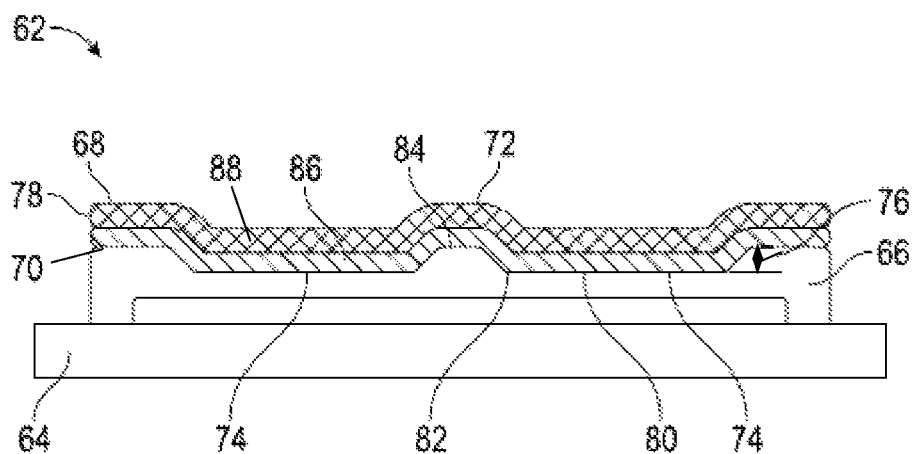
FIG. 2 is a cross-sectional view of an embodiment of a coated component.

FIG. 2 schematically illustrates a cross-sectional view of a hot section component 62 of the gas turbine engine, for example, a combustor, a turbine exhaust case, an exit nozzle or an augmentor. The component 62 includes a shell portion 64, which in some embodiments may be annular, and a panel 66 secured to the shell portion 64 by, for example, on or more mechanical fasteners. The panel 66 defines a flowpath of hot combustion gases past the component 62. The panel 66 includes a coating 68 applied to an inner panel surface 70 that, in some embodiments, defines a flowpath surface 72. The coating 68 is configured to protect or shield the panel 66 from thermal effects of the hot combustion gases, erosion, and/or provide other performance-enhancing characteristics to the panel 66 and thus the component 62.

To improve retention of the coating 68 at the panel 66, the panel 66 includes one or more pockets 74 formed in the inner panel surface 70, the pocket 74 having a pocket depth 76. In some embodiments, the pocket depth 76 is equal to a thickness of the coating 68. The coating 68 is applied across the pocket 74 such that a coating edge 78 is disposed in the pocket 74, thus preventing a "free edge" in the coating 68. In some embodiments, the pocket 74 includes a base portion 80 with the pocket depth 76, and a transition portion 82 extending from the base portion 80 to the inner surface 70. In some embodiments, the transition portion 82 is linear or curvilinear.

Figure 3:
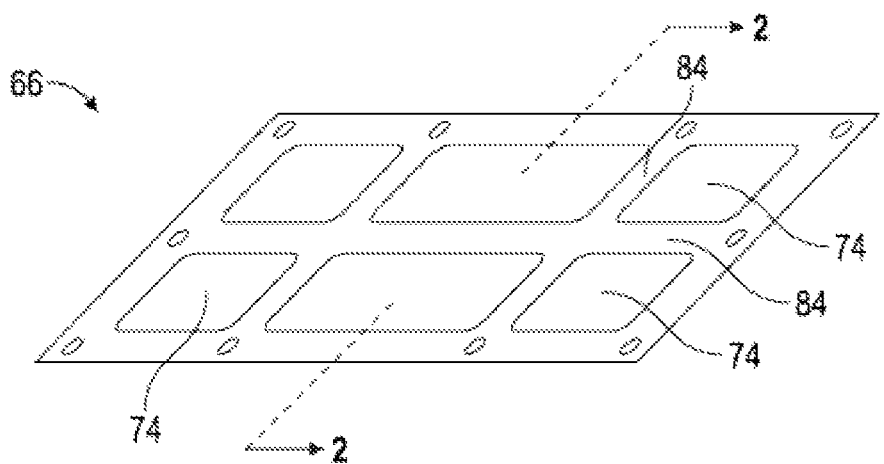
FIG. 3 is a perspective view of an embodiment of a coated component.
Figure 4:
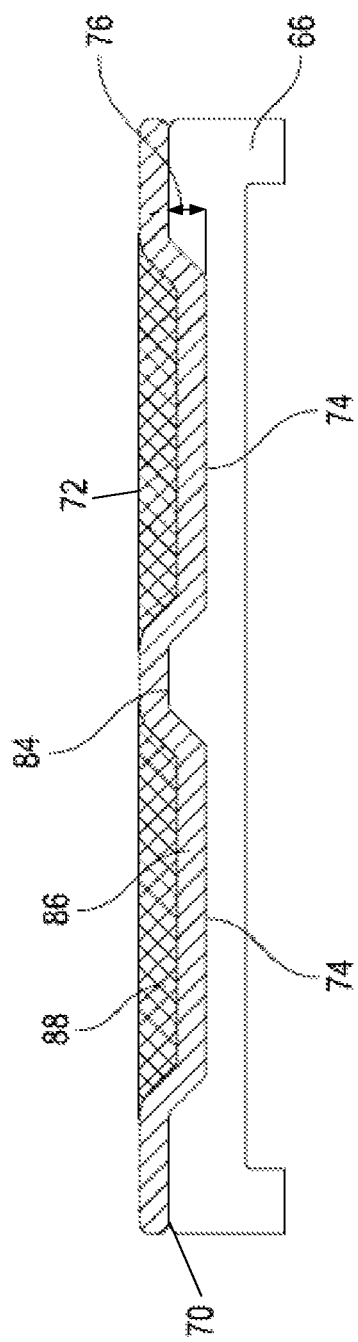
FIG. 4 is a cross-sectional view of another embodiment of a coated component.

As shown in FIGS. 2 and 3, in some embodiments the panel 66 includes a plurality of pockets 74 arrayed at the inner surface 70, with ribs 84 disposed between adjacent pockets 74 of the plurality of pockets 74. In the embodiment of FIG. 2, the coating 68 may extend over the ribs 84. Further, in some embodiments, the coating may include a base coat 86, such as a metallic coating, and a top coat 88 of a second material. In such embodiments, the base coat 86 may extend across the ribs 84, while the top coat 88 is applied only in the pockets 74, as shown in FIG. 4. As shown, the pockets 74 result in localized reduction in material thickness of the panel 66, which can reduce thermal expansion mismatch between the panel 66 and the coating 68.

Figure 5:
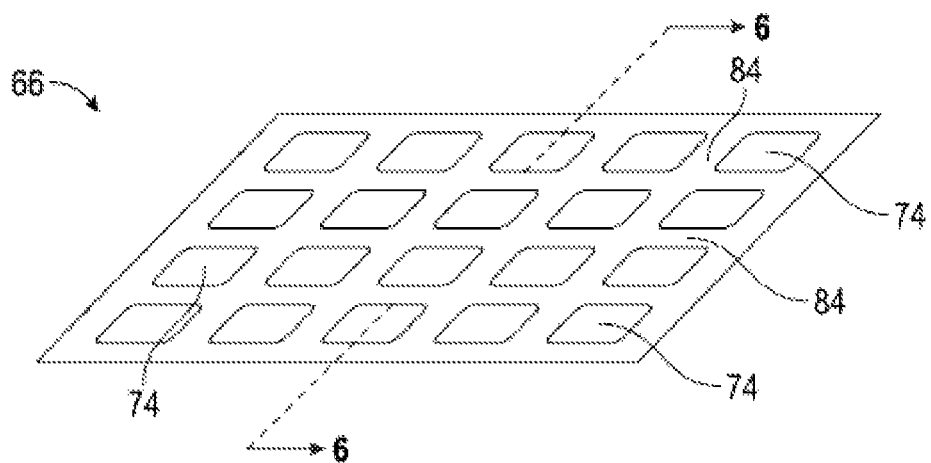
FIG. 5 is a perspective view of another embodiment of a coated component.
Figure 6:
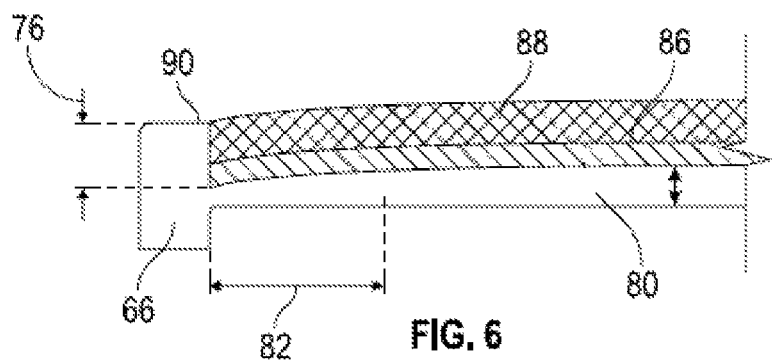
FIG. 6 is a cross-sectional view of another embodiment of a coated component.
Figure 7:
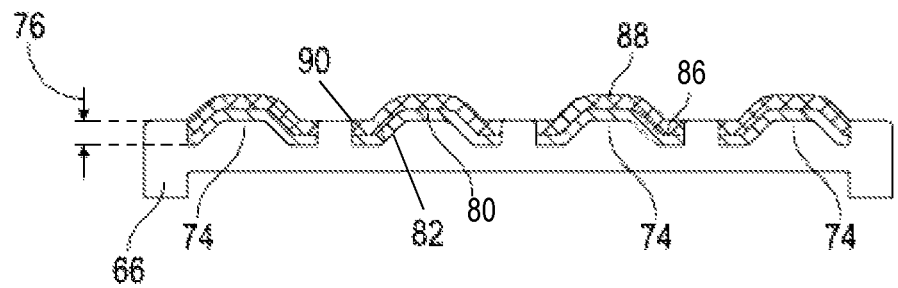
FIG. 7 is a cross-sectional view of another embodiment of a coated component.

In another embodiment, illustrated in FIGS. 5 and 6, the maximum pocket depth 76 is located at or near a pocket edge 90, with the pocket depth 76 becoming shallower with increasing distance from the pocket edge 90. In some embodiments, such as in FIG. 6, the pocket depth 76 transitions to a minimum pocket depth 76 having a linear cross-sectional profile, while in the embodiment of FIG. 7, the cross-sectional profile of the pocket depth 76 is curvilinear.

Figure 8:
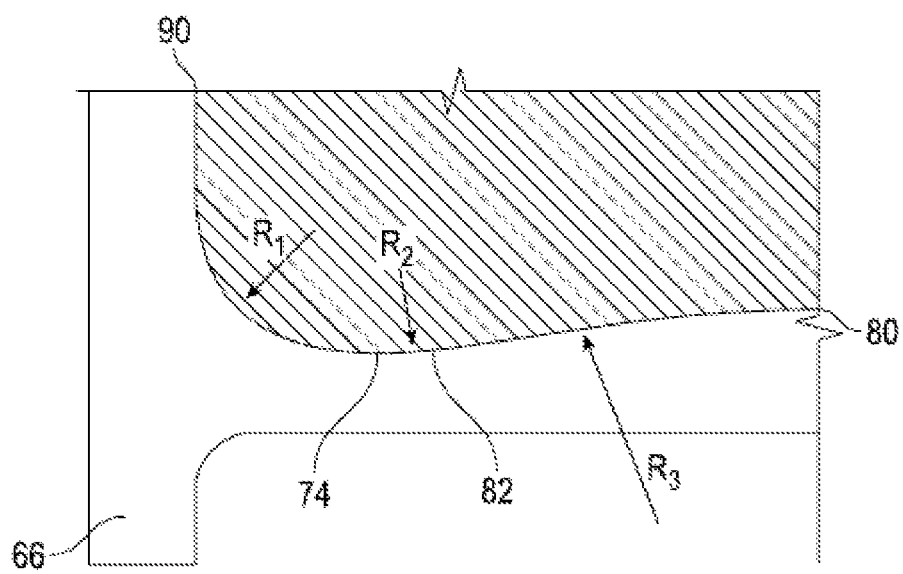
FIG. 8 is a cross-sectional view of an embodiment of a transition area of a coated component.

As shown in FIG. 8, the pocket may be formed with one radius in the transition portion 82 between the base portion 80 and the pocket edge 90. In other embodiments, the transition portion 82 may include compound radii, for example, combinations of two, three or more radii between the pocket edge 90 and the base portion 80.

It is to be appreciated that while the embodiments of pockets 74 illustrated are rectangular in shape, one skilled in the art will readily appreciate that the pockets 74 may be formed in other shapes, such as hexagonal, square, circular, oval, triangular, or the like.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A coated panel for a gas turbine engine, comprising:
   a panel having a panel inner surface defining a hot gas path;
   a pocket formed in the panel inner surface, the pocket having a pocket depth; and
   a coating applied to the pocket such that the furthest extent of the coating remains disposed within the pocket to enhance coating retention to the panel;
   the pocket further including a base portion and a pocket edge, with the pocket depth becoming shallower with increasing distance from the pocket edge and both base portion and pocket edge are coated with the coating.

2. The coated panel of claim 1, wherein the pocket includes a transition portion extending from the base portion to the pocket edge, the transition portion including one or more radii.

3. The coated panel of claim 2, wherein a maximum pocket depth is located at the transition portion.

4. The coated panel of claim 2, wherein the base portion is substantially planar.

5. The coated panel of claim 1, wherein the pocket is one of a plurality of pockets disposed in the panel inner surface; and ribs are disposed between adjacent pockets of the plurality of pockets.

6. A gas turbine engine, comprising:
   a turbine;
   a combustor to supply hot combustion gases to the turbine along a gas path;
   a liner; and
   one or more coated panels disposed over the liner along the gas path, including:
   a panel having a back surface; and
   a panel inner surface disposed opposite the back surface and defining the gas path,
   the back surface disposed between the panel inner surface and the liner;
   a pocket formed in the panel inner surface, the pocket having a pocket depth; and
   a coating applied to the pocket such that the furthest extent of the coating remains disposed within the pocket to enhance coating retention to the panel;
   the pocket further including a base portion and a pocket edge, with the pocket depth becoming shallower with increasing distance from the pocket edge and both base portion and pocket edge are coated with the coating.

7. The gas turbine engine of claim 6, wherein the pocket includes a transition portion extending from the base portion to the pocket edge, the transition portion including one or more radii.

8. The gas turbine engine of claim 7, wherein a maximum pocket depth is located at the transition portion.

9. The gas turbine engine of claim 7 wherein the base portion is substantially planar.

10. The gas turbine engine of claim 6, wherein the pocket is one of a plurality of pockets disposed in the panel inner surface; and ribs are disposed between adjacent pockets of the plurality of pockets.

11. The gas turbine engine of claim 6, wherein the coated panel is disposed at one of the combustor, a turbine exhaust case or an exhaust nozzle of the gas turbine engine.

12. A combustor panel for a gas turbine engine, comprising:
   a panel having a panel inner surface defining a hot gas path;
   a pocket formed in the panel inner surface, the pocket having a pocket depth; and
   a coating applied to the pocket such that the furthest extent of the coating is disposed within the pocket to enhance coating retention to the panel;
   the pocket further including a base portion and a pocket edge, with the pocket depth becoming shallower with increasing distance from the pocket edge and both base portion and pocket edge are coated with the coating.

13. The combustor panel of claim 12, wherein the pocket is one of a plurality of pockets disposed in the panel inner surface; and ribs are disposed between adjacent pockets of the plurality of pockets.

* * * * *